US011025782B2

(12) United States Patent
Boussac et al.

(10) Patent No.: US 11,025,782 B2
(45) Date of Patent: Jun. 1, 2021

(54) END-TO-END SESSION-RELATED CALL DETAIL RECORD

(71) Applicant: EXFO Solutions SAS, Saint-Jacques-de-la-Lande (FR)

(72) Inventors: Thierry Boussac, Rennes (FR); Nicolas Cornet, Saint Aubin du Pavail (FR); Antoine Vallee, Guichen (FR)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 0 days.

(21) Appl. No.: 16/708,904

(22) Filed: Dec. 10, 2019

(65) Prior Publication Data

US 2020/0186651 A1 Jun. 11, 2020

Related U.S. Application Data

(60) Provisional application No. 62/777,882, filed on Dec. 11, 2018.

(51) Int. Cl.
*H04M 15/00* (2006.01)
*H04L 29/06* (2006.01)
(Continued)

(52) U.S. Cl.
CPC ........ *H04M 15/41* (2013.01); *H04L 65/1006* (2013.01); *H04L 65/1069* (2013.01);
(Continued)

(58) Field of Classification Search
CPC ...... H04M 15/41; H04M 15/43; H04M 15/55; H04M 15/8228; H04M 2215/0164;
(Continued)

(56) References Cited

U.S. PATENT DOCUMENTS

| 6,052,448 A | 4/2000 | Janning |
| 6,249,572 B1 | 6/2001 | Brockman et al. |

(Continued)

FOREIGN PATENT DOCUMENTS

| CN | 107451192 A | 12/2017 |
| CN | 108462785 A | 8/2018 |

OTHER PUBLICATIONS

F. Vancea et al., Secure Data Retention of Call Detail Records, Int J. of Computers, Communications & Control, ISSN 1841-9836, E-ISSN 1841-9844, vol. V (2010), No. 5, pp. 961-967.
(Continued)

*Primary Examiner* — Yuwen Pan
*Assistant Examiner* — Hung K Du
(74) *Attorney, Agent, or Firm* — Clements Bernard Walker; Lawrence A. Baratta, Jr.

(57) ABSTRACT

A method, implemented in a distributed system including a plurality of processing devices, generates an end-to-end Call Detail Record (CDR) on voice and multimedia telecommunication sessions over a plurality of telecommunication network elements and interfaces. The method includes the steps of receiving CDRs generated in real-time and streamed by multiple network elements, each CDR referring to a specific interface or protocol, processing the received CDRs as they are received to identify the specific interface or protocol to which the received CDR refers and to identify a single telecommunication session based on a key associated with the received CDR, and creating an end-to-end CDR incrementally based on all of the received CDRs identified for the single telecommunication session, wherein at least two of the received CDRs have a different interface or protocol from one another.

20 Claims, 7 Drawing Sheets

(51) Int. Cl.
  *H04W 4/24* (2018.01)
  *H04M 3/22* (2006.01)
  *H04L 12/24* (2006.01)
  *H04L 12/26* (2006.01)

(52) U.S. Cl.
  CPC ............ *H04M 15/43* (2013.01); *H04M 15/55* (2013.01); *H04M 15/8228* (2013.01); *H04W 4/24* (2013.01); *H04M 2215/0164* (2013.01)

(58) Field of Classification Search
  CPC ............. H04M 3/2218; H04L 65/1006; H04L 65/1069; H04L 41/022; H04L 41/0226; H04L 41/04; H04L 43/00; H04W 4/24
  See application file for complete search history.

(56) References Cited

U.S. PATENT DOCUMENTS

| | | |
|---|---|---|
| 6,298,123 B1 | 10/2001 | Molting et al. |
| 6,327,350 B1 | 12/2001 | Spangler et al. |
| 6,400,813 B1 | 6/2002 | Birnhak |
| 6,614,893 B1 | 9/2003 | Paiz |
| 6,714,979 B1 | 3/2004 | Brandt et al. |
| 6,731,730 B1 | 5/2004 | Zolotov |
| 6,891,938 B1 | 5/2005 | Scott et al. |
| 6,912,230 B1 | 6/2005 | Salkini et al. |
| 7,190,772 B2 | 3/2007 | Moisey et al. |
| 7,231,024 B2 | 6/2007 | Moisey et al. |
| 7,254,109 B2 | 8/2007 | Verma et al. |
| 7,424,103 B2 | 9/2008 | Kernohan et al. |
| 7,599,359 B1 | 10/2009 | Croak et al. |
| 8,126,123 B2 | 2/2012 | Cai et al. |
| 8,731,162 B1 | 5/2014 | Majd et al. |
| 8,792,482 B2 | 7/2014 | Stein et al. |
| 9,369,569 B1* | 6/2016 | Lam ................. H04M 15/55 |
| 9,414,248 B2 | 8/2016 | Kovvali et al. |
| 9,420,117 B2 | 8/2016 | Majd et al. |
| 9,647,956 B2 | 5/2017 | Dwarkha et al. |
| 9,749,840 B1 | 8/2017 | Damle et al. |
| 9,992,123 B2 | 6/2018 | Ouyang et al. |
| 10,061,637 B1 | 8/2018 | Halbersberg et al. |
| 10,063,406 B2 | 8/2018 | Tapia et al. |
| 10,164,850 B2 | 12/2018 | Tapia et al. |
| 2002/0199182 A1 | 12/2002 | Whitehead |
| 2005/0251406 A1 | 11/2005 | Bolt et al. |
| 2005/0276400 A1 | 12/2005 | Morrison et al. |
| 2006/0045248 A1 | 3/2006 | Kernohan et al. |
| 2010/0128860 A1 | 5/2010 | Kung et al. |
| 2011/0158395 A1 | 6/2011 | Farel et al. |
| 2011/0243124 A1 | 10/2011 | Huntley et al. |
| 2013/0304363 A1 | 11/2013 | Dai et al. |
| 2014/0269445 A1 | 9/2014 | Majd et al. |
| 2015/0310336 A1 | 10/2015 | Sotela et al. |
| 2017/0353991 A1 | 12/2017 | Tapia et al. |
| 2018/0192303 A1 | 7/2018 | Hui et al. |
| 2018/0198924 A1 | 7/2018 | Kovács et al. |
| 2018/0270126 A1 | 9/2018 | Tapia et al. |
| 2018/0287901 A1 | 10/2018 | Bisada |
| 2018/0309616 A1* | 10/2018 | Kollipara ............ H04L 41/5067 |
| 2019/0073686 A1 | 3/2019 | Drake et al. |
| 2020/0186651 A1* | 6/2020 | Boussac ................ H04M 15/43 |

OTHER PUBLICATIONS

Baruch Sterman, Ph.D., Real-Time Billing in SIP, deltathree The IP Communications Network™, pp. 1-18.
Tauriainen, Can you hear me now? A call detail record based end-to-end diagnostics system for mobile networks, 978-3-903176-24-9, 2019 IFIP, pp. 1-7.
Zhang et al., Deep Learning in Mobile and Wireless Networking: A Survey, IEEE Communications Surveys & Tutorials, 2018, pp. 1-67.
Mijumbi et al., Network Function Virtualization: State-of-the-art and Research Challenges, arXiv:1509.07675v1, [cs.NI], IEEE, Sep. 25, 2015, pp. 1-28.
Mdini et al., ARCD: a Solution for Root Cause Diagnosis in Mobile Networks, HAL Id: hal-01962869 https://hal-imt-atlantique.archives-ouvertes.fr/hal-01962869, Submitted on Dec. 20, 2018, pp. 1-6.
Zhu et al., A Supervised Learning Based QoS Assurance Architecture for 5G Networks, IEEE Access, vol. 7, 2019, pp. 43598-43606.
Sultan et al., Call Detail Records Driven Anomaly Detection and Traffic Prediction in Mobile Cellular Networks, IEEE Access, vol. 6, 2018, pp. 41728-41737.
Asghar et al., Self-Healing in Emerging Cellular Networks: Review, Challenges, and Research Directions, IEEE Communications Surveys & Tutorials, vol. 20, No. 3, Third Quarter 2018, pp. 1682-1709.
Muñoz et al., A method for identifying faulty cells using a classification tree-based UE diagnosis in LTE, EURASIP Journal onWireless Communications and Networking, (2017) 2017:130, DOI 10.1186/s13638-017-0914-3, pp. 1-20.
James et al., An Introduction to Statistical Learning with Applications in R, Feb. 11, 2013, pp. 1-440.
Celdrán et al., Automatic monitoring management for 5G mobile networks, ScienceDirect, Procedia Computer Science 110, 2017, Procedia Computer Science, pp. 328-335.
Parwez et al., Big Data Analytics for User User-Activity Analysis and User User-Anomaly Detection in Mobile Wireless Network, DOI 10.1109/TII.2017.2650206, IEEE, 1551-3203, 2016, pp. 1-8.
Gómez-Andrades et al., Automatic Root Cause Analysis for LTE Networks Based on Unsupervised Techniques, IEEE Transactions on Vehicular Technology, vol. 65, No. 4, Apr. 2016, pp. 2369-2386.
Léo et al., Call Detail Records to Characterize Usages and Mobility Events of Phone Users, HAL Id: hal-01303707 https://hal.inria.fr/hal-01303707, Submitted on Apr. 18, 2016, pp. 1-5.
Liang et al., Mercury: Metro Density Prediction with Recurrent Neural Network on Streaming CDR Data, Computer Science, 2016 IEEE 32nd International Conference on Data Engineering (ICDE), pp. 1-4.
Szilágyi et al., An Automatic Detection and Diagnosis Framework for Mobile Communication Systems, IEEE Transactions on Network and Service Management, vol. 9, No. 2, Jun. 2012, pp. 184-197.
Muniyandi et al., Network Anomaly Detection by Cascading K-Means Clustering and C4.5 Decision Tree algorithm, SciVerse ScienceDirect, Procedia Engineering 30, 2012, pp. 174-182.
Molsten et al., A Bayesian Approach for Automated Troubleshooting for UMTS Networks, ResearchGate, Conference Paper, Oct. 2006, DOI: 10.1109/PIMRC.2006.254370, Source: IEEE Xplore, pp. 1-6.
Barco et al., System for automated diagnosis in cellular networks based on performance indicators, Special Issue on Self-organisation in Mobile Networking, European Transactions on Telecommunications, Euro. Trans. Telecomms. 2005; 16:399-409, DOI: 10.1002/ett.1060, pp. 1-11.
Naboulsi et al., Classifying Call Profiles in Large-scale Mobile Traffic Datasets, 978-1-4799-3360-0/14, 2014, IEEE, pp. 1-9.
Ravichandran et al., Comparative Study on Decision Tree Techniques for Mobile Call Detail Record, Journal of Communication and Computer 9, 2012, pp. 1331-1335.
Rezaei et al., Automatic fault detection and diagnosis in cellular networks using operations support systems data, 2016 IEEE/IFIP Network Operations and Management Symposium (NOMS 2016), DOI: 10.1109/NOMS.2016.7502845, pp. 1-7.
Khanafer et al., Automated Diagnosis for UMTS Networks Using Bayesian Network Approach, IEEE Transactions on Vehicular Technology, vol. 57, No. 4, Jul. 2008, pp. 2451-2460.
Chen et al., Comprehensive Predictions of Tourists' Next Visit Location Based on Call Detail Records using Machine Learning and Deep Learning methods, 2017, IEEE 6th International Congress on Big Data, DOI 10.1109/BigDataCongress.2017.10, pp. 1-6.
Barco et al., Automatic diagnosis of mobile communication networks under imprecise parameters, ScienceDirect, Expert Systems with Applications 36, 2009, pp. 489-500.
Aziz et al., Analysis of Call Detail Records of International Voice Traffic in Mobile Networks, 978-1-5386-4646-5/18, 2018, IEEE, pp. 475-480.

(56) References Cited

OTHER PUBLICATIONS

Gómez-Andrades et al., Automatic Root Cause Analysis Based on Traces for LTE Self-Organizing Networks, 1536-1284/16, IEEE Wireless Communications, Jun. 2016, pp. 20-28.
Wu et al., Characterizing and Predicting Individual Traffic Usage of Mobile Application in Cellular Network, Computer Science, UbiComp '18, 2018, pp. 852-861.

* cited by examiner

END-TO-END SESSION-RELATED CALL DETAIL RECORD

CROSS-REFERENCE TO RELATED APPLICATION(S)

The present disclosure claims priority to U.S. Provisional Patent Application No. 62/777,882, filed Dec. 11, 2018, the contents of which are incorporated herein by reference.

FIELD OF THE DISCLOSURE

The present disclosure generally relates to the technical field of mobile telecommunications networks using multiple network elements. More specifically, it relates to the generation of composite end-to-end session related data records that unify information extracted from multiple Call Detail Records relating to individual call, text, or data sessions conducted over multiple network elements and interfaces.

BACKGROUND OF THE DISCLOSURE

Mobile Network Operators (MNO) today offer increasing numbers of services as new technologies are developed. Whilst such services must be attractive, seamless, and easy to use for customers, the reality for MNOs is far more complex. As operators enhance services, so the number of interfaces used increases. Call Detail Records, CDR (also called Charging Data Records), are conventionally generated by telecommunications equipment or probes to document various attributes of a voice call or other telecommunications transaction (e.g., text message or the like) that passes through that device or facility. CDRs are used for various purposes, such as billing, logging, analytics, etc. For example, CDRs can be used by law enforcement for investigations, etc. Calls conducted over multiple network elements and interfaces will lead to the generation of multiple CDRs. For example, a Voice over Long Term Evolution (VoLTE) service may involve the use of 4 domains, 50 procedures, 15 interfaces, and associated equipment with between 20 and 50 CDRs being generated. Whilst each CDR provides information about the status of its monitored equipment and interface or protocol; there is no common standard on the content nor on the frequency or timing of generation. Consequently, the information contained in the various CDRs produced by one telecommunication session will frequently be formatted differently, while the CDRs themselves may arrive at different times, and thus out of sequence. As a result, the monitoring of calls or data sessions over such a service currently requires a large number of tools and manpower, and even with such investment, it is not always possible to provide adequate Quality of Service (QoS) and customer satisfaction.

Various methods have been proposed for consolidating information from multiple CDRs into a consolidated report. However, these methods typically deal with a single network or network type and, consequently, with CDRs generated within the same interface.

For example, U.S. Pat. No. 7,424,103 to Kernohan et al. describes a call record correlation method for the detection of misrouted calls within an SS7 (Signalling System No. 7) network, in which all CDRs are related to a single protocol.

While these proposed methods may provide an adequate consolidation of call record details over specific interfaces or technologies, they are not equipped to deal with telecommunication sessions comprising multiple interfaces and protocols.

BRIEF SUMMARY OF THE DISCLOSURE

The present disclosure concerns methods and systems for generating an end-to-end Call Detail Record (CDR) that reliably and effectively correlates information from multiple network elements, protocols. and interfaces, including different protocols, interfaces, data formats, etc. The end-to-end CDR is generated in real-time based on streaming of individual CDRs that are processed to identify the sessions, through a distributed system. The distributed system minimizes latency by incrementally creating the end-to-end CDR where the individual CDRs arrive unordered.

In an embodiment, a method, implemented in a distributed system including a plurality of processing devices, generates an end-to-end Call Detail Record (CDR) on voice and multimedia telecommunication sessions over a plurality of telecommunication network elements and interfaces. The method includes the steps of receiving CDRs generated in real-time and streamed by multiple network elements, each CDR referring to a specific interface or protocol, processing the received CDRs as they are received to identify the specific interface or protocol to which the received CDR refers and to identify a single telecommunication session based on a key associated with the received CDR, and creating an end-to-end CDR incrementally based on all of the received CDRs identified for the single telecommunication session, wherein at least two of the received CDRs have a different interface or protocol from one another.

The method can further include, in a sequence of identified CDRs for a given telecommunication session, determining a first CDR to contain fault data and incorporating this fault data into the end-to-end CDR for the given telecommunication session. The method can further include identifying CDRs that correspond to the single telecommunication session using one or more of a timestamp corresponding to the telecommunication session and a subscriber identifier corresponding to the telecommunication session. The method can further include generating two end-to-end CDRs for one telecommunication session, each end-to-end CDR corresponding to one direction of said telecommunication session and incorporating data in each of the end-to-end CDR identifying the other of the end-to-end CDR.

The creating the end-to-end CDR is performed in real-time where the end-to-end CDR is incrementally created, and wherein the creating the end-to-end CDR can be finalized based on a timeout value to address late or missing CDRs. The CDRs can be from a plurality of different types of probes and at least two of the different types of probes have a different data structure for their corresponding CDRs. The CDRs can be for a voice session including any of legacy calls (2G or 3G); Circuit Switched Fallback (CSFB) calls: Internet Protocol Multimedia Subsystem (IMS) calls (4G or Wi-Fi); and Inter Radio Access Technology (RAT) Handover (HO) calls: 3G to 2G, 2G to 3G, Single Radio Voice Call Continuity (SRVCC) to 2G or 3G, 4G to Wi-Fi, Wi-Fi to 4G. The specific interface can include any of a Service Gateway (SG) interface, an Iu CS interface, an S1 interface, an Sv interface, a Session Initiation Protocol (SIP) interface, and an A interface.

In another embodiment, a distributed system for generating an end-to-end Call Detail Record (CDR) on voice and multimedia telecommunication sessions over a plurality of telecommunication network elements and interfaces includes a plurality of processing devices configured to receive CDRs generated in real-time and streamed by multiple network elements, each CDR referring to a specific interface or protocol, process the received CDRs as they are received to identify the specific interface or protocol to which the received CDR refers and to identify a single telecommunication session based on a key associated with the received CDR, and create an end-to-end CDR incrementally based on all of the received CDRs identified for the single telecommunication session, wherein at least two of the received CDRs have a different interface or protocol from one another.

In a further embodiment, a non-transitory computer-readable medium includes instructions stored thereon for programming processing devices in a distributed system to perform the steps of receiving CDRs generated in real-time and streamed by multiple network elements, each CDR referring to a specific interface or protocol, processing the received CDRs as they are received to identify the specific interface or protocol to which the received CDR refers and to identify a single telecommunication session based on a key associated with the received CDR, and creating an end-to-end CDR incrementally based on all of the received CDRs identified for the single telecommunication session, wherein at least two of the received CDRs have a different interface or protocol from one another.

The above-described embodiments may be combined with one another in any combination.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Call Detail Records (CDR), also referred to as Charging Detail Records, are records generated by network elements or probes for documenting various attributes of a voice call or other telecommunications transaction conducted via a mobile telecommunications device, such as a mobile phone. The information contained in a CDR is used for billing the subscriber, but also to monitor a call or data session and to identify events that affect the network or service. Exemplary embodiments of the present invention provide methods for generating end-to-end records of a telecommunication transaction that is independent of the network type, the session type, and the equipment used to generate CDRs.

While the term Call Detail Record, CDR is used typically to documents voice calls, this document uses this term to refer to records of any telecommunication transaction or session type, including, but not limited to voice, Short Message Service (SMS) and Multimedia Messaging Service (MMS) services, and data services. These broader types of CDRs are sometimes referred to as xDRs.

The present disclosure provides creation of an end-to-end CDR that is based on various individual CDRs, of different formats, protocols, interfaces, etc. The present disclosure is to be able to generate summaries of end-to-end subscriber activities with a minimum latency and based on per interface CDRs which can arrive unordered, with some latency or some of them being simply missing, in order to:

Provide a uniform reporting of activities made by users, whatever technology is used, and ease the troubleshooting process;

Accurately evaluate end-user oriented KPIs vs network oriented KPIs that are traditionally computed;

Accurately and immediately provide detailed root failure cause and faulty equipment identification.

In an embodiment, the methods presented herein are implemented in a distributed computing system. Specifically, to minimize the latency, CDRs have to be processed in real time and not in post processing which implies the following constraints:

A single process will not be able to handle the input flow, so the processing is distributed among several processes while minimizing the inter-process communications;

It is not feasible to buffer the input CDRs for the duration of the activity so the end-to-end CDRs have to be built incrementally from the input CDRs seen;

There is a high variety of CDR types to be handled to build a single end-to-end CDR, they can arrive in any order (not necessarily reflecting the order of messages in the initial flow), and some CDRs may be missing when the corresponding part of the network is not monitored or due to a capture problem.

Call Detail Records

Figure 1A:
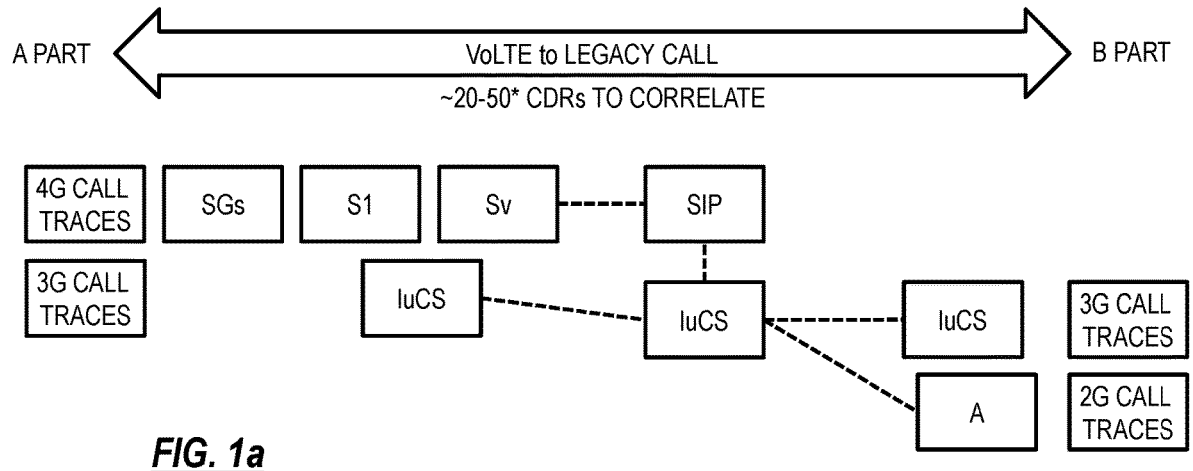
FIG. 1a schematically illustrates a call conducted over multiple network elements and interfaces.

A particular problem when overseeing call or data sessions over complex aggregate networks is the timely and reliable identification of faults. This problem can be illustrated with reference to FIGS. 1a to d, which illustrates schematically an example call between two parties over interfaces in multiple network layers. The interfaces implicated in the call are illustrated in FIG. 1a. The call is divided into two parts based on the calling and called party, respectively. Part A, is a VoLTE call over 4G and IMS (IP Multimedia Subsystem) with mobility towards 3G, while Part B is a Legacy call located in 3G and 2G networks. FIG. 1a includes various interfaces such as Service Gateways (SGs), an Iu CS interface (between a Radio Network Controller (RNC) and a Circuit Switched Core Network (CS-CN)), an S1 interface (between eNodeBs and the Evolved Packet Core (EPC)), an Sv interface, Session Initiation Protocol (SIP) interface, and an A interface.

For example, it is assumed that Part B of the call suffers from a radio event after the communication has been established, resulting in an interruption of the call. A scenario of this type typically involves between 20 and 50 CDRs over RAN (Radio Access Network), EPC, CS, and IMS domains.

Figure 1B:
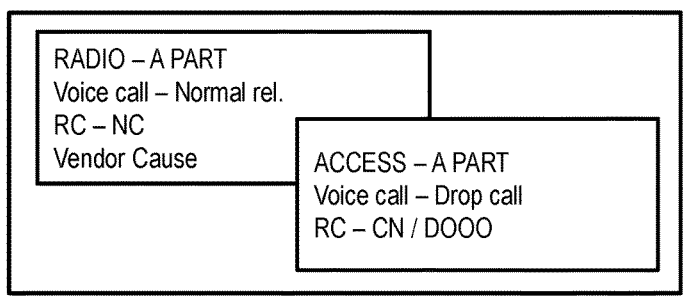
FIGS. 1b to 1d (prior art) illustrate fault diagnosis using conventional CDRs.
Figure 1C:
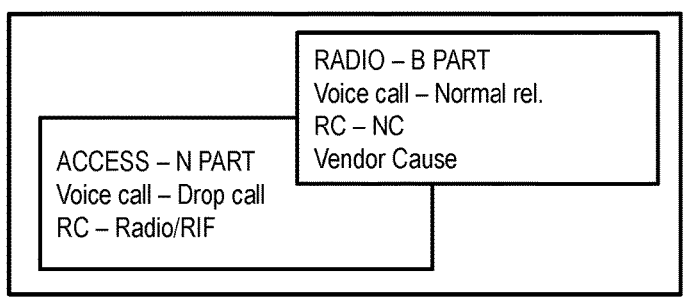
Figure 1D:
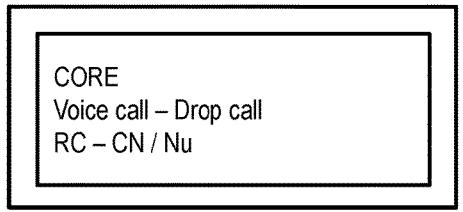

Conventional analytics and network monitoring of CDRs generated by such a scenario results in isolated diagnoses of the cause for the call drop, as illustrated in FIGS. 1b to 1d. With reference to FIG. 1b, for Part A, the dropped call is deemed to be due to the Core Network (DOOO—Destination Out of Order). With reference to FIG. 1c, the cause for Part B is diagnosed as a Radio failure (RIF—Radio Interface Failure). With reference to FIG. 1d, the core network diagnosis is a release due to core network reasons (Nu—Normal Unspecified). From these isolated statements, it is difficult to link Part A of the call to Part B, let alone conclude that the call drop experienced in the A part was in reality caused by the radio failure observed in the B part.

Example Telecommunication Session

Figure 2:
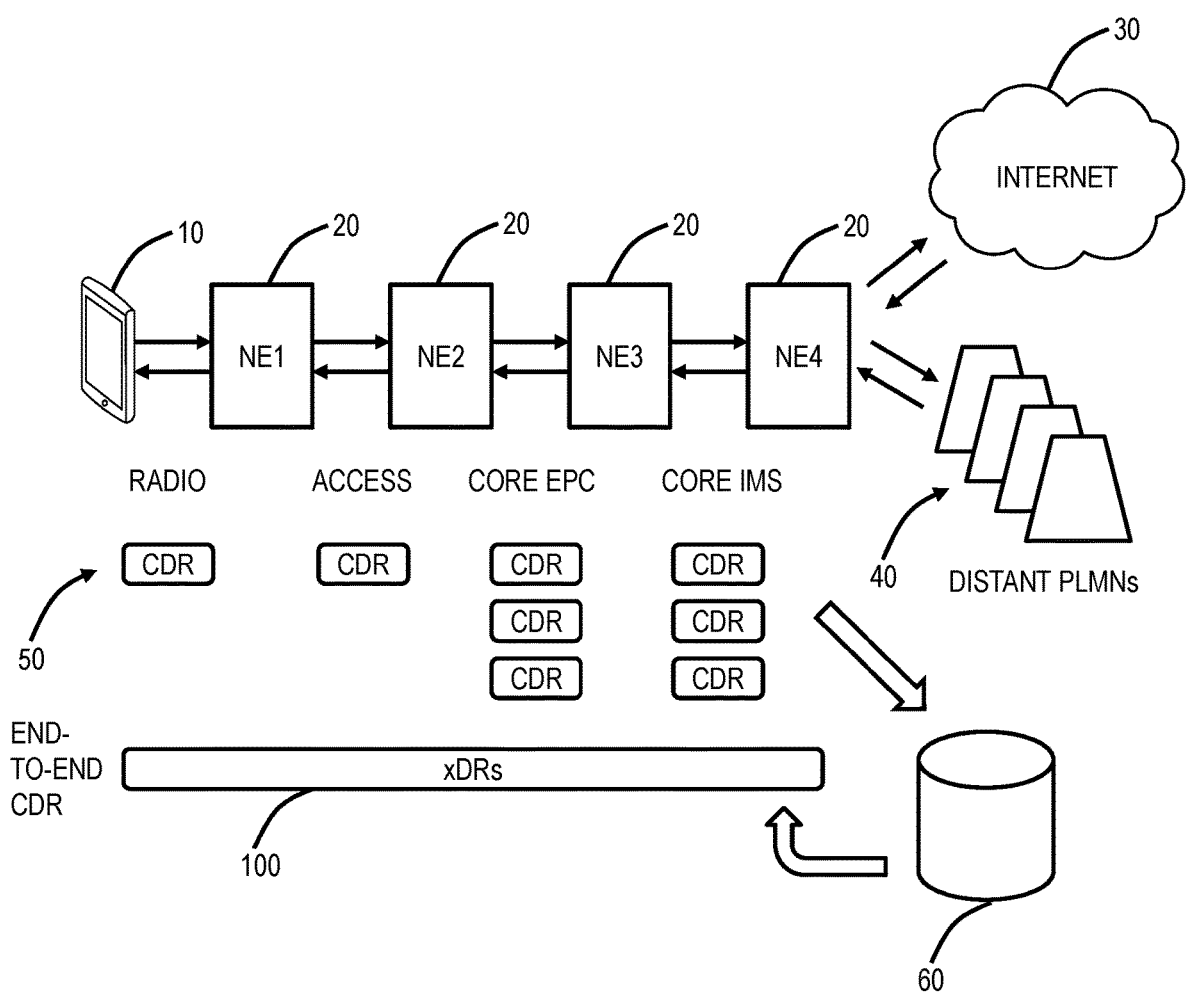
FIG. 2 illustrates the concept of an end-to-end CDR according to the present invention.

Turning now to FIG. 2, there is depicted two possible telecommunication session paths between a mobile communication device 10 and a remote party (not shown). The communication paths terminate either in a distant PLMN (Public Land Mobile Network) 40 or on the Internet 30. A number of network elements 20, NE1 to NE4, and interfaces carry the communication transaction. In the illustrated example, the interfaces include radio, Access, Core EPC (Evolved Packet Core), and Core IMS (IP Multimedia Subsystem Core). One or more CDRs 50 is generated at each of these interfaces and collected in a Data Gateway 60. While these CDRs carry information common to the telecommunication session, their format, time of generation, and frequency of generation vary according to the interface to which they relate. In accordance with the present invention, an end-to-end CDR 100 is compiled using the information contained in the multiple CDRs. The information collated from the multiple CDRs 50 generated in a telecommunication session may include, but is not limited to the following information:

| | |
|---|---|
| Root causes | Core interface Identities |
| Used network elements | Core interface Destinations |
| Valuable information from each interface | Core interface routes |
| Radio call trace Geolocation | User Plane CDR Service provider |
| Radio call trace radio condition | Type of service |
| Radio call trace Indoor/outdoor | Quality of Experience (QoE) and usage |

End-to-End CDR Generation System

Figure 3:
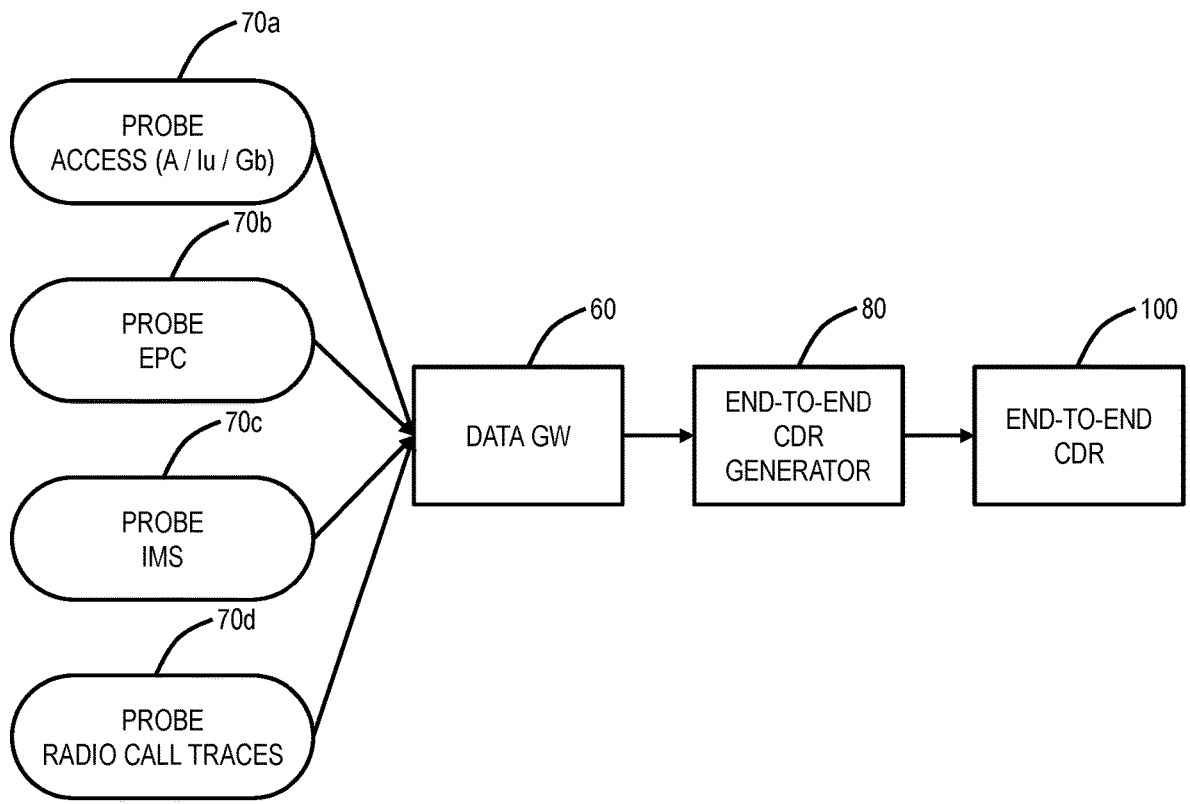
FIG. 3 schematically illustrates a system for generating end-to-end CDRs according to one aspect of the present invention.

FIG. 3 depicts schematically a system for generating end-to-end CDRs for telecommunication sessions according to an aspect of the present invention. In FIG. 3, a number of probes 70a-d are shown that generate one or more CDRs for each telecommunication session carried by the associated interface. For example, the uppermost probe 70a generates CDRs related to the Global System for Mobile communications (GSM)/General Packet Radio Service (GPRS) and Universal Mobile Telecommunications Service (UMTS) signaling and user plane interfaces A Iu and Gb.

The second probe 70b generates CDRs relating to EPC interfaces, the third probe 70c emits CDRs relating to IMS interfaces and the lowermost probe 70d collects radio call traces generated by network equipment, such as Base Transceiver System (BTS), NodeB, or Evolved NodeB (eNodeB) for each call and data session and emits CDRs. The CDRs are, in turn, collected in the gateway 60. While the elements 70 are all shown as probes in the illustrated example, it will be understood by those skilled in the art that CDRs may be generated by other network elements, in which case the CDRs will also be gathered by the gateway 60.

The gateway 60 may decode the CDRs prior to feeding a CDR stream to the End-to-End CDR generator 80, which applies certain correlation rules to the CDRs in order to identify those CDRs relating to a single telecommunication session. Part of the extraction requires the identification of the CDR format, which is a function of the interface, or protocol, to which it refers. The End-to-End CDR generator 80 thus determines an identifier in each CDR that relates to its source interface. Based on this interface identifier, the End-to-End CDR generator 80 is able to map the information in the CDR to a common data model. Data from this common data model is then extracted from those identified CDRs and complied into an end-to-end CDR 100 that incorporates all CDR information relevant to the telecommunication session. Each end-to-end CDR contains information from the beginning to the end of one leg of a telecommunication session, e.g., either from an originating mobile phone or user to a terminating mobile phone or user, or vice versa.

The end-to-end CDR 100 may be formatted in the common data model, which enables the one or more CDRs 50 to share a common format, namely a single end-to-end CDR 100 covering multiple CDRs 50. Again, the CDRs 50 have a format, time of generation, frequency of generation, etc. that vary for different interfaces. The objective of the end-to-end CDR 100 is to present a single CDR that covers all CDRs 50 for the same session. Again, as described herein, a conventional session may have tens of different CDRs 50. The common data model can include various components, such as a meta portion which contains full session information over all interfaces, a macro portion which contains data summarizing each phase of the transaction over several interfaces (e.g., setup, HO, release, etc.), and a procedure portion which provides details across interfaces in the macro portion. In this example, the meta portion provides information related to Customer Experience Management (CEM) applications, and the macro portion provides information dedicated to Performance Management, Fault Management, deep troubleshooting, etc. Variously, the end-to-end CDR 100 may be referred to as a "meta CDR."

Benefits of the end-to-end CDR 100 include automatic ordering of the different CDRs 50 in the end-to-end CDR 100 for the overall session, mapping of the common data model for different and heterogenous domains crossed by the session, enrichment of mandatory information such as International Mobile Subscriber Identity (IMSI), Mobile Station International Subscriber Directory Number (MSISDN), etc. Further, the end-to-end CDR 100 provides an automatic correlation between the A part and the B part, such as in FIG. 1. The end-to-end CDR 100 enables automated diagnosis for relevant root cause issues for both parties, based on intelligent rules. Further, the end-to-end CDR 100 enables unique metrics (e.g., counters, Key Performance Indicators (KPIs), etc.) for QoE and QoS. Finally, the end-to-end CDR 100 enables disparate CDRs 50 from different probe 70 suppliers, at different protocols, at different interfaces, etc.

Figure 10:
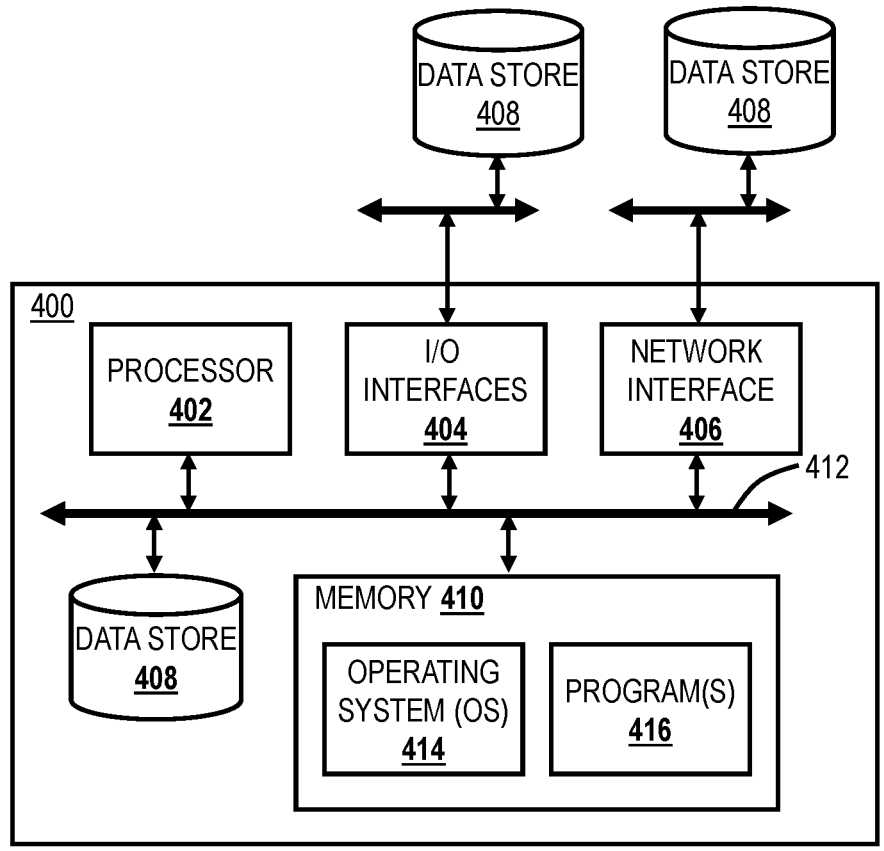
FIG. 10 illustrates a block diagram of a processing device that may be used to implement the systems and methods described herein.

The gateway 60 and End-to-End CDR generator 80 depicted in FIG. 3 are preferably implemented on one or more processors with associated memory, such as illustrated in the processing device 300 of FIG. 10. The memory stores instructions, in the form of a computer program, for causing the processor or processors to carry out the steps described herein. The memory may be any suitable type of computer-readable memory and may be of volatile and/or non-volatile type. The processor may be any suitable type of computation unit, e.g., a microprocessor, Digital Signal Processor (DSP), Field Programmable Gate Array (FPGA), or Application Specific Integrated Circuit (ASIC) or any other form of circuitry.

End-to-End CDR Generation Process

Figure 4:
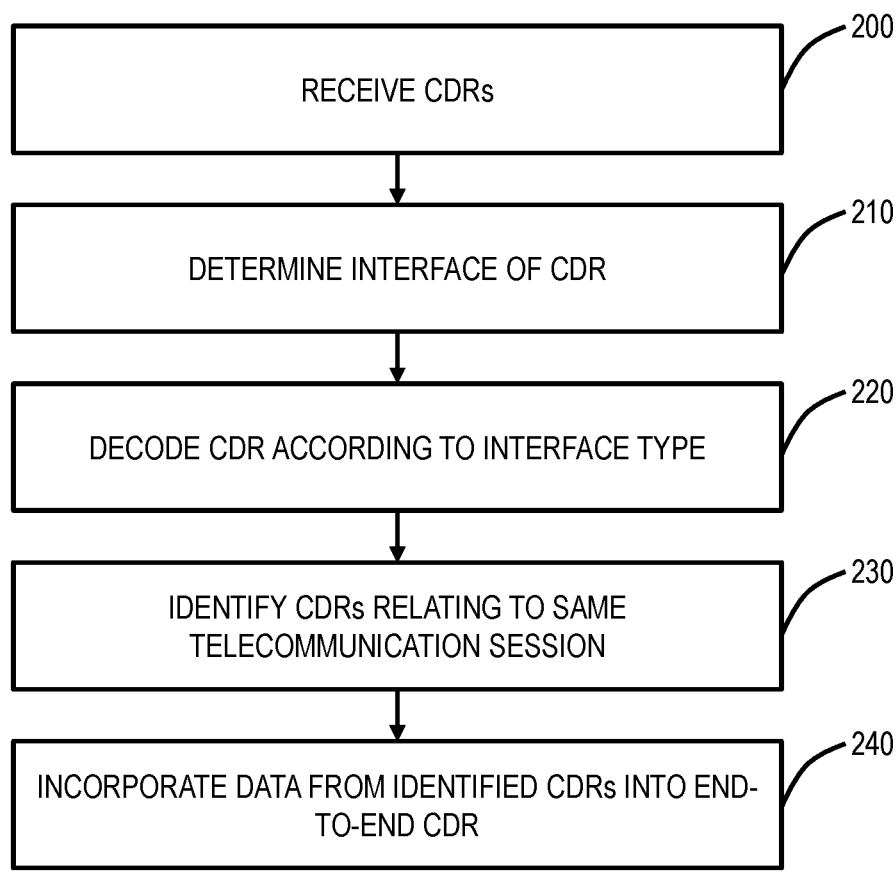
FIG. 4 illustrates a flow chart illustrating the process carried out by the elements of FIG. 3.

The process performed by the elements of FIG. 3 is illustrated in the flow chart of FIG. 4. At step 200, the system, and specifically gateway 60 receives the CDRs. At step 210, the End-to-End CDR generator 80 determines the interface to which the CDR relates. Each CDR includes an identifier associated with the interface and or protocol to which the CDR relates. The interface and/or protocol of the CDR, in turn, determines the format of the CDR. A mapping is done for predefined interfaces regardless of the information the CDR could contain. In a telecommunication session using multiple network elements and interfaces, it is important that the CDRs are correctly decoded to ensure the successful extraction of the relevant information from that portion of the call or session. Step 210 identifies and stores the CDRs of the interfaces that will be used for End-to-End CDR generation. Step 210 reduces the data volume to decode and limits the resources needed for the correlation. At step 220, the End-to-End CDR generator 80 decodes the CDRs according to the identified interface. As part of this decoding, the CDR information is preferably mapped to an End-to-End CDR common data model for subsequent processing. At step 230, the End-to-End CDR generator 80 identifies the CDRs that relate to the same telecommunication session. This may be achieved by correlating the CDRs according to subscriber identities, such as the IMSI. Further correlation parameters include the start and end timestamps of a telecommunication session, the location, the root cause of a fault, etc. A CDR may be associated with a telecommunication session if it has a timestamp within the window of the telecommunication session (with a certain tolerance). At step 240, data from identified CDRs is incorporated into an End-to-End CDR representative of one leg of a telecommunication session, i.e., one direction of a call, text, or data session, also referred to as Mobile Originated (MO) or Mobile Terminated (MT). This may be achieved by first mapping information from the common data model, to which the identified CDRs may be mapped in step 220 to an End-to-End CDR model. The data may then be merged into the End-to-End CDR.

The CDRs are received continuously from the probes and network elements 70 as they are generated. The CDRs may be stored prior to processing or processed as and when they arrive to generate a current record of the state of the network, and hence to allow any fault and its location to be identified and, if possible, mitigated without minimal delay.

Figure 5:
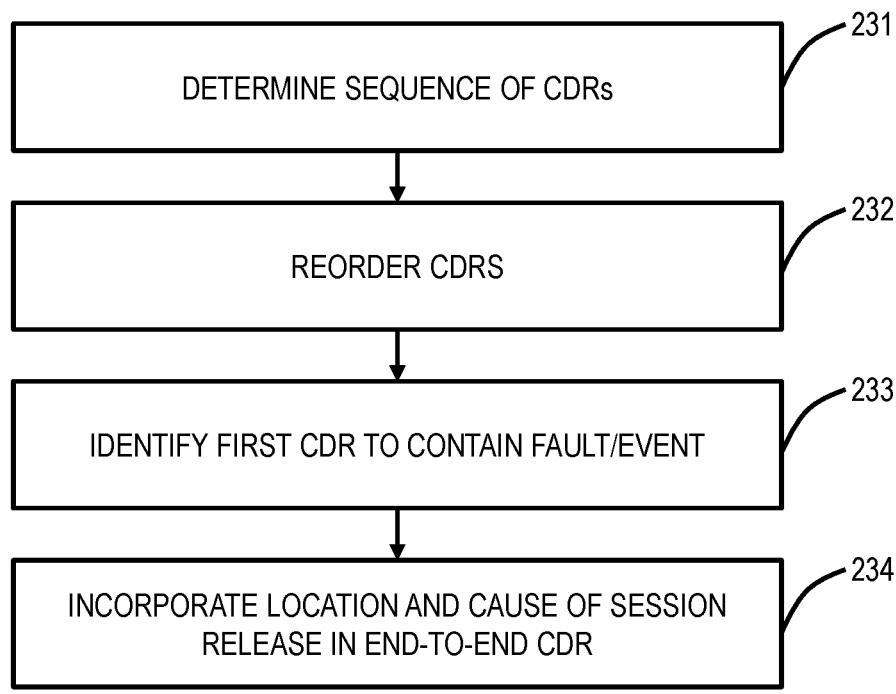
FIG. 5 illustrates a flow chart illustrating a further process carried out by the elements of FIG. 3 according to a further aspect of the present invention.

It may occur that a CDR is received out of order or sequence, as the generation frequencies of CDRs may differ from one probe or network element 70 to another. This occurrence can have implications on a number of aspects of the content of the end-to-end CDR, one of which is the identification and localization of events or faults that occur during a telecommunication session. FIG. 5 illustrates a supplemental process that may be performed between steps 230 and 240 of the process of FIG. 4 in accordance with a further aspect of the present invention.

FIG. 5 starts at step 231 with the determination of the sequence or order of the CDRs identified as relating to the same telecommunication session. The CDRs are preferably coded in a common data model following step 230 of FIG. 4. The sequence of a CDR in relation to other identified CDRs may be determined by examining the communication timestamp. In any telecommunication session, CDRs will record events that occur in succession as the call or data session progresses through the network. While the CDR may not is immediate, it contains timestamp data concerning the telecommunication session. Hence, the chronological order of the CDRs can be determined and the CDRs re-ordered in this manner. This is performed in step 232. Reordering the CDRs, therefore, includes reordering the identified CDRs into a sequence corresponding to a chronological order in which each CDR is linked from a communication perspective, regardless of when they could have been generated depending on their source.

At step 233, the re-ordered CDRs are examined for faults or events that affect a telecommunication session to determine which CDR reports a fault that triggered a session release. In general, this is the first recorded fault or event in the reordered sequence of CDRs as any CDR generated downstream of a detected fault will report the same fault or event or report a consequence of that fault. Preferably an algorithm analyses the end time, event, and causes in the different CDRs on the different interfaces to determine the event that triggered call release. This may be based on the timing of the release, such as the earliest fault reported within a certain time window of the session release. Alternatively, this may be based on specific flagging events that may be considered as a reason for call release. At step 234, the data relating to the fault or call release event is incorporated in the End-to-End CDR. This includes the fault location, i.e., the interface and network element responsible for or implicated in the call release as well as the cause as reported in the original CDR.

Fault Diagnosis

As discussed above, the End-to-End Call Detail Records generated according to the invention relate to a single leg of a telecommunications session. However, for fault diagnosis, it is particularly advantageous to link the End-to-End Call Detail Records relating to both legs of the telecommunication session, such that the End-to-End CDR relating to the call path of a calling party is linked to that of a called party. Thus, in accordance with the present invention, the End-to-End CDR generator 80 associates the two End-to-End CDRs with one another by incorporating identifying information from one End-to-End CDR in that of the other, and vice versa. Preferably, this information is included as remote subscriber information. By linking the two End-to-End CDRs implicated in a single call or session, the fault diagnosis is rendered more efficient, as the release cause of one leg may well be the root release cause of the other leg in the case of a call drop.

Example End-to-End CDR for Voice Services

The following provides an example of an end-to-end CDR 100 for a voice service, including examples of the possible information included therein.

| | |
|---|---|
| Subscriber ID | IMSI/MSISDN |
| | International Mobile Equipment Identity (IMEI)/Device |
| | Location of A party |
| Call Info | Call type/direction |
| | Remote MSISDN |
| | Location of B party |
| Efficiency | Last cause of A party |
| | Root cause category |
| | The root cause of a complete call |
| Mobility | Radio Access Technology (RAT), cell, Network Element (NE) |
| Radio | Last Global Positioning Satellite (GPS) location |
| | Radio measures (echo, RSSI, etc.) |
| Times | Setup time (per RAT) |
| | Alerting/Call duration (per RAT) |
| | Call duration per RAT |
| MOS (Real-Time Protocol (RTP) | Mean Opinion Score (MOS) at the end of the call Jitter |

For a voice session, one end-to-end CDR 100 corresponds to the activity from the beginning to the end of one leg of a call (Mobile Originated (MO) or Mobile Terminated (MT) and gathers important information taken in CDRs 50 of the different interfaces. This means that two voice end-to-end CDRs 100 can be generated if both ends of the call corresponding to users on the network. However, in such a case, the voice end-to-end CDRs 100 of both legs are associated so that a part of the information of one leg is included in the other leg's end-to-end CDR 100 as remote subscriber information. The release cause of one leg can also be used as the root release cause of the other leg in case of a drop for instance.

A partial end-to-end CDR 100 is also emitted in case of call setup success in order to be used for analytics calculations to minimize the delay for statistic generation.

A voice end-to-end CDR 100 can include legacy calls (2G or 3G), Circuit Switched Fallback (CSFB) calls, IMS calls (4G or Wi-Fi), Inter Radio Access Technology (RAT) Handover (HO) calls: 3G to 2G, 2G to 3G, Single Radio Voice Call Continuity (SRVCC) to 2G or 3G, 4G to Wi-Fi, Wi-Fi to 4G, etc.

The following illustrate example interfaces for voice end-to-end CDRs 100:

A Interface, Iu CS Interface
    Call CDRs are directly needed for Meta CDR creation
    Location CDRs may be included in CSFB
    Supplementary Services can be necessary to detect CSFB for S that need to be differentiated from Voice CSFB
    Unknown incoming HO may be correlated with outgoing HO for known voice activity.
MAP (Mobile Application Part)
Type Send Routing Information (SRI) or Private Roaming Number (PRN):
    Incoming CS and CSFB calls
S1
Type: Extended Service Request
    Incoming and Outgoing CSFB Calls
Type: Paging
    May be correlated with incoming CSFB Calls or IMS Calls
Type: Service Request with paging number >0
    May be correlated with incoming IMS Calls
Type: Release
    May be correlated with CSFB and IMS calls
Type: HO
    May be correlated with IMS Calls
Type: Additional Bearer Activation, Additional Bearer Modification, Additional Bearer Modification, PDN Disconnect
    Correlated with IMS Calls
SGs
Type: Service, subtype: CS Call
    Correlated for Incoming CSFB Calls
S11
QCI: 1 or 2
    Correlated with IMS Calls
DL Data Notification
    May be correlated with incoming IMS Calls
SIP
Type: Invite, Bye, Update, Cancel
    Correlated with IMS (VoLTE/VoWIFI), or CS/CSFB Calls (SIP-I/SIP-T)
Type: Register
    May be correlated with IMS Calls to detect 4G/Wi-Fi mobilities in call Example End-to-End CDR Applications The end-to-end CDR 100 can be used for performance, Service Oriented Communications (SOC), CEM monitoring, and various other use cases. For example, the end-to-end CDR 100 an be used for Customer-Centric with Quality of Experience (QoE), including Customer Care Diagnosis: Overall activity including Radio Coverage Experience, Customer Management: Fleet management, Customer journey, and SQM: Service Quality Management. Further, the end-to-end CDR 100 can be used Network Performance Analytics including Voice & Mobility Performance (e.g., VoLTE/VoWIFI), Idle Mobility & registration (e.g., customer habits and Idle location per RAT, registration to the network for local subs and roamers (inbound and outbound), etc.), Mobility Connected, SMS & Messaging, Unstructured Supplementary Service Data (USSD), and Data Bearer. Various other use cases are also contemplated such as behavior monitoring, etc.

Third-Party CDR Data Inclusion

An aspect of the end-to-end CDR 100 includes the data-agnostic capability from a CDR 50 perspective, namely the ability to support the probes 70 or interfaces from any protocol, any format, any vendor, etc. Such a feature is enabled via the common data model format, which allows different CDRs to coexist in the end-to-end CDR 100.

Example End-to-End CDR Generator System

Figure 6:
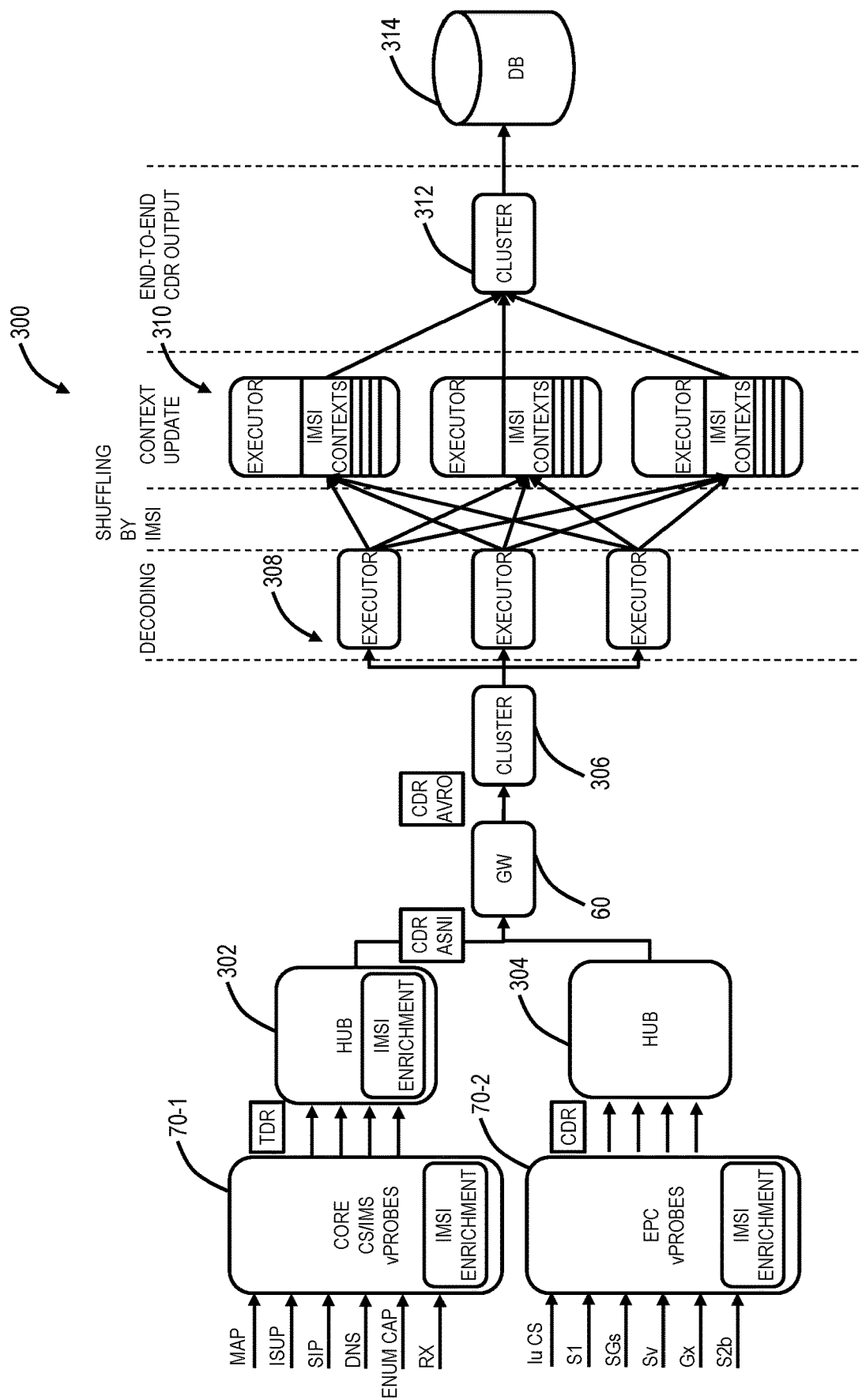
FIG. 6 schematically illustrates an example distributed system implementation for generating end-to-end CDRs according to one aspect of the present invention.

FIG. 6 depicts schematically an example implementation of a distributed system 300 for generating end-to-end CDRs 100 for telecommunication sessions according to an aspect of the present invention. The distributed system 300 is presented as an example of one implementation, and those of ordinary skill in the art will recognize other embodiments are contemplated. The distributed system 300 can be a distributed computing system that is capable of receiving streaming data, e.g., the CDRs 50 as generated, and processing the streamed data incrementally to create the end-to-end CDRs 100 on the fly. FIG. 6 includes probes 70-1, 70-2. The probes 70-1 can be Core CS/IMS-based probes including virtual probes (vprobes), providing information related to MAP, ISUP, SIP, DNS, ENUM CAP, RX, etc. The probes 70-2 can be EPC-based probes including vprobes, providing information related to various interfaces. The outputs, namely the CDRs 50, of the probes 70-1, 70-2 are provided to hubs 302, 304, and streamed to the gateway 60. The gateway 60 can provide the streaming CDRs 50 to the distributed system 300 that includes various processing devices 306, 308, 310, 312. The distributed system 300 can include Apache Kafka, Arvo, Spark, and Hive in an embodiment; other techniques are also contemplated.

The processing device 306 can receive the streaming CDRs 50, provide the streaming CDRs 50 to the processing devices 308 for decoding (e.g., data normalization). The output of the processing devices 308 can be shuffled, such as according to IMSI and provided to the processing devices 310 for updating the context of specific end-to-end CDRs 100, such as based on the IMSI, and the output provided to a database 314 for storage and retrieval.

Again, an aspect of the present invention is to create the end-to-end CDRs 100 substantially in real-time, i.e., with minimum latency. The CDRs 50, e.g., from the problems 70-1, 70-2 arrive unordered, with some missing, with some latency, etc. to the distributed system 300. The distributed system 300 is configured to manage these constraints, namely receive the CDRs 50 in a streaming manner and incrementally build corresponding end-to-end CDRs 100.

As described herein, the CDRs 50 are generated by different network elements (e.g., probes 70, network elements 20, etc.) at different times during a given session. The CDRs 50 are streamed to the distributed system 300 where streaming means sending the CDRs 50 as they are generated to the distributed system 300. The distributed system 300 is configured to process the streamed CDRs as they are received for a given session, as opposed to waiting for all CDRs 50 to be received for the given session and performing post processing. By receiving the streamed CDRs 50 and processing them as they are received, the distributed system 300 incrementally builds the end-to-end CDR 100 from the streamed CDRs 50, in a manner where the end-to-end CDR 100 is available as the given session concludes (or shortly thereafter), i.e., without significant latency. Note, the streamed CDRs 50 may be received in any order as well with the distributed system 300 configured to manage the order in the creation of the end-to-end CDR 100.

Thus, the CDRs 50 are initially read by different processes in the distributed system 300 without preconception of the corresponding associated user. The interesting information in each CDR 50 is then routed to creation contexts on the processing devices 310 based on a single key. As described herein, the key is some unique identifier present in every input CDR 50. For example, the key can be the IMSI, and other values are contemplated. If the key is unavailable, there can be a pre-enrichment process for that CDR 50 to obtain such key. Also, if one CDR 50 can be determined as corresponding to more than one subscriber (e.g., mobile to mobile calls), then that CDR the has to be duplicated to be associated each with a different key.

The end-to-end CDR 100 creation processes handles CDRs 50 individually for each subscriber. Each input CDR 50 is initially considered as a separate end-to-end CDR 100 whose fields are filled with the information available in the CDR 50 including the root failure cause and faulty equipment data.

A set of telecom-oriented rules then allows the distributed system 300 to identify temporary CDRs 50 actually corresponding to the same activity, the corresponding data is then merged into a single end-to-end CDR 100 context according to some merging rules that include a method for determining the most accurate root cause data based on timestamps and cause types.

When the identity of another user can be determined for one end-to-end CDR 100 after correlation (for instance discovery of the identity of the called user), the useful data has to be transmitted to the context for this user each time new interesting data is retrieved (e.g., new root cause information). In order to cope with late CDRs 50, the actual generation of the end-to-end CDR 100 in the output of the process is driven by timeouts whose duration depends on the current state of the activity and the level of completeness of the data that was gathered so far.

Voice End-to-End CDR Examples

Figure 7:
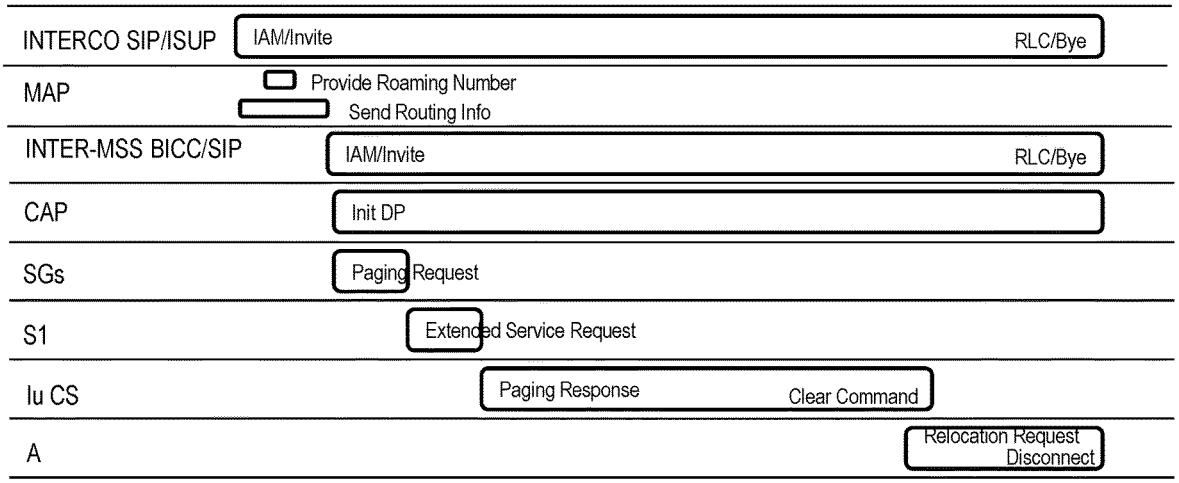
FIGS. 7 and 8 illustrate examples of two voice end-to-end CDRs.
Figure 8:
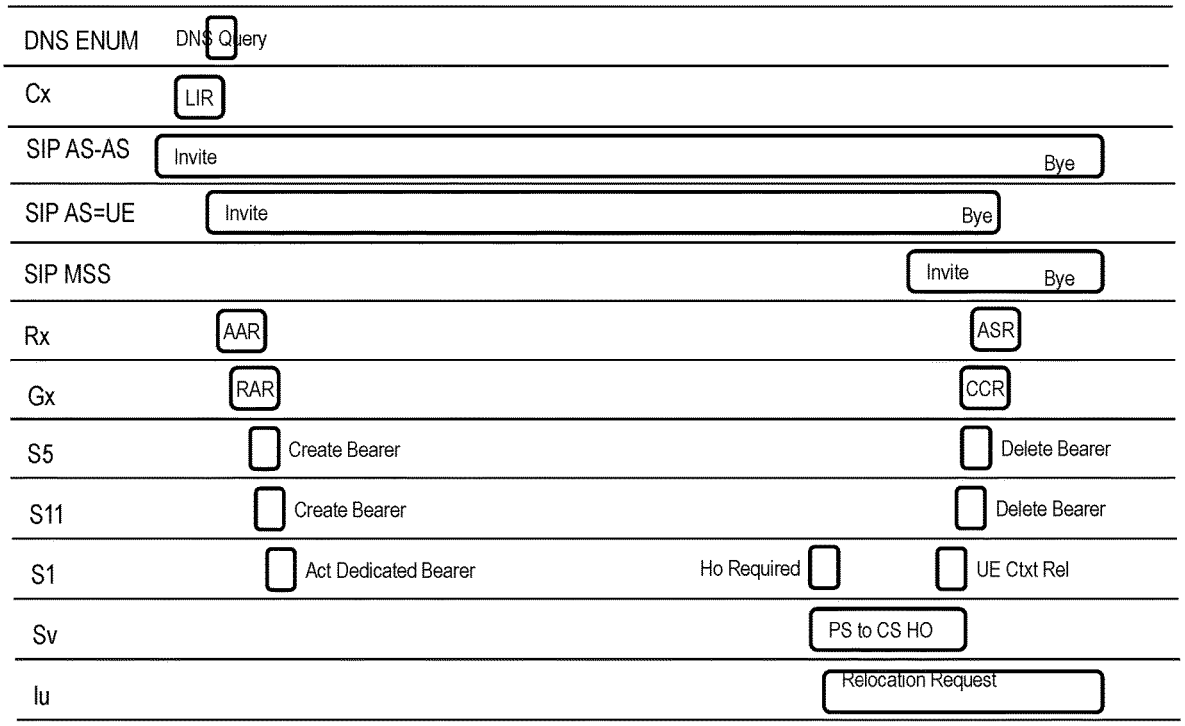

FIGS. 7 and 8 depict illustrative examples of two voice end-to-end CDRs 100. Specifically, FIG. 7 depicts examples of various CDRs 50 correlated into an end-to-end CDR 100 for an MT CSFB call. FIG. 8 depicts examples of various CDRs 50 correlated for an MT VoIMS call with SRVCC. As mentioned herein, information gathered on the different interfaces, for the different protocols, and corresponding to the end-to-end call are gathered in a single data structure in the end-to-end CDR 100, including:

Call summary: type, start/end times, call status, setup, and call durations on the different RATs, etc.
Location Information: start/end cells and RAT, serving network, etc.
VOIP measurements when applicable: MOS, jitter, etc.
Subscriber Information: IMSI, Home PLMN, IMEI, Handset Type, MSISDN, etc.
Remote Subscriber Information: information on the subscriber at the other side of the call: IMSI, Location, type of call, etc.
Information on the inter-RAT mobilities that happened during the call.

Rules for Intelligent Root Cause Diagnosis

Figure 9:
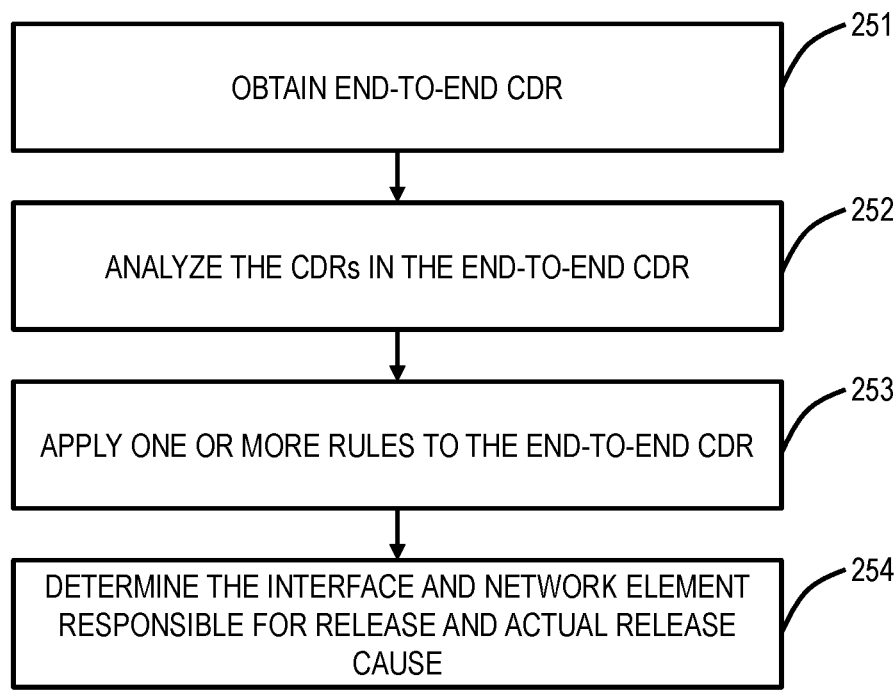
FIG. 9 illustrates a flow chart illustrating a supplemental process associated with the supplemental process of FIG. 5 for determining root (release) cause via the end-to-end CDRs.

An aspect of the present disclosure includes root cause determinations via the end-to-end CDRs 100. FIG. 9 illustrates a supplemental process associated with the supplemental process of FIG. 5 for determining root (release) cause via the end-to-end CDRs 100. FIG. 9 starts with an end-to-end CDR 100 at step 251. At step 252, the process analyses the end time, event, and causes of the different CDRs 50 on the different interfaces to determine the one that actually triggered the call release. This determination can be based on the timing of releases, such as the earliest message preceding the actual call release, within a certain time tolerance. This determination can also be based on specific flagging of events that can be considered as a reason for the call end or not. This determination can further include an application of one or more rules to the CDR at step 253 to diagnosis the root cause. Finally, at step 254, the end-to-end CDR 100 can be updated to indicate the interface and network equipment responsible for the release and the actual release cause. This cause is then used to categorize the call release reason.

Rules for Merging CDRs

Again, as described herein, a single telecommunications session can have, for example, 20 to 50 different CDRs associated with it. Of course, other values are possible. For the end-to-end CDR 100, there is a requirement to develop so-called merge rules for determining whether two different CDRs 50 apply to the same telecommunication session. Further, these merge rules can be used to determine information for the end-to-end CDR 100 These merge rules can be implemented in the distributed system 300 to determine the CDRs 50 should be assigned to a specific end-to-end CDR 50.

One example merge rule can include a SIP call ID matching. Here, two different CDRs 50 with at least one SIP call ID in common may be merged into the same end-to-end CDR 100.

Another example merge rule can include a SIP charging ID. Here, two different CDRs 50 with at least one SIP charging ID in common may be merged into the same end-to-end CDR 100. Also, the Core Start Event may be different than from a SIP Register.

Another example merge rule can include a CSFB Merge rule where the call start on an A interface or Iu interface CDR 50 is merged with that of an S1 or SGs interface.

Another example merge rule can include a merge of an S1 User Equipment (UE) Context Release or HO with CSFB.

Another example merge rule can relate to RAN mobility. Here, the rule can relate to one CDR 50 being an outgoing mobility and another CDR 50 matching the start of incoming mobility. Also related to RAN mobility, there can be merge rules related to the same start time (with a tolerance) and matching destinations numbers or remote IMSI. There can also be merge rules with the same start time (with a tolerance) with the same call direction when one of the remote MSISDN values is not present.

Yet another example merge rule can include matching Mobile Station Roaming Number (MSRN) numbers.

Those of ordinary skill in the art will recognize the foregoing presents example merge rules and the present disclosure contemplates any condition that can be used to link two CDRs 50 together in the end-to-end CDR 100. That is, the merge rules can be any conditions where met are indicative that two different CDRs 50 are related. Further, the merge rules can define which information is used in the end-to-end CDR 100, such as related to failure, call times, etc.

Processing Device

FIG. 10 is a block diagram of a processing device 400, which may be used to implement the systems and methods described herein. The processing device 400 may be a digital computer that, in terms of hardware architecture, generally includes a processor 402, input/output (I/O) interfaces 404, a network interface 406, a data store 408, and memory 410. It should be appreciated by those of ordinary skill in the art that FIG. 10 depicts the processing device 400 in an oversimplified manner, and a practical embodiment may include additional components and suitably configured processing logic to support known or conventional operating features that are not described in detail herein. The processing device 400 is a building block of the devices 60, 302, 304, 308, 310, 312, 314 associated with the distributed system 300.

The components (402, 404, 406, 408, and 410) are communicatively coupled via a local interface 412. The local interface 412 may be, for example, but not limited to, one or more buses or other wired or wireless connections, as is known in the art. The local interface 412 may have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 may be any custom made or commercially available processor, a central processing unit (CPU), an auxiliary processor among several processors associated with the processing device 400, a semiconductor-based microprocessor (in the form of a microchip or chipset), or generally any device for executing software instructions. When the processing device 400 is in operation, the processor 402 is configured to execute software stored within the memory 410, to communicate data to and from the memory 410, and to generally control operations of the processing device 400 pursuant to the software instructions. The I/O interfaces 404 may be used to receive user input from and/or for providing system output to one or more devices or components. The user input may be provided via, for example, a keyboard, touchpad, and/or a mouse. System output may be provided via a display device and a printer (not shown). I/O interfaces 404 may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface 406 may be used to enable the processing device 400 to communicate over the network 120, etc. The network interface 406 may include, for example, an Ethernet card or adapter or a Wireless Local Area Network (WLAN) card or adapter. The network interface 406 may include address, control, and/or data connections to enable appropriate communications on the network. A data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media. In one example, the data store 408 may be located internal to the processing device 400, such as, for example, an internal hard drive connected to the local interface 412 in the processing device 400. Additionally, in another embodiment, the data store 408 may be located external to the processing device 400, such as, for example, an external hard drive connected to the I/O interfaces 404 (e.g., SCSI or USB connection). In a further embodiment, the data store 408 may be connected to the processing device 400 through a network, such as, for example, a network-attached file server.

The memory 410 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 may include one or more software programs, each of which includes an ordered listing of executable instructions for implementing logical functions. The software in the memory 410 includes a suitable operating system (O/S) 414 and one or more programs 416. The operating system 414 essentially controls the execution of other computer programs, such as the one or more programs 416, and provides scheduling, input-output control, file and data management, memory management, and communication control and related services. The one or more programs 416 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a distributed system including a plurality of processing devices, for generating an end-to-end Call Detail Record (CDR) on voice and multimedia telecommunication sessions over a plurality of telecommunication network elements and interfaces, the method including the steps of:
    receiving CDRs generated in real-time and streamed by multiple network elements, each CDR referring to a specific interface or protocol,
    processing the received CDRs as they are received to identify the specific interface or protocol to which the received CDR refers and to identify a single telecommunication session based on a key associated with the received CDR, and
    creating an end-to-end CDR incrementally based on all of the received CDRs identified for the single telecommunication session, wherein at least two of the received CDRs have a different interface or protocol from one another,
    wherein the creating the end-to-end CDR is performed in real-time where the end-to-end CDR is incrementally created, and wherein the creating the end-to-end CDR is finalized based on a timeout value to address late or missing CDRs, and wherein the timeout value is based on a current state of the single telecommunications session and a completeness of the data gathered from the received CDRs.

2. The method of claim 1, further comprising, in a sequence of identified CDRs for a given telecommunication session, determining a first CDR to contain fault data and incorporating this fault data into the end-to-end CDR for the given telecommunication session.

3. The method of claim 1, further comprising identifying CDRs that correspond to the single telecommunication session using one or more of a timestamp corresponding to the telecommunication session, subscriber identifier corresponding to the telecommunication session and rules applied to identifiers available within the CDR.

4. The method of claim 1, further comprising generating two end-to-end CDRs for one telecommunication session, each end-to-end CDR corresponding to one direction of said telecommunication session and incorporating data in each of the end-to-end CDR identifying the other of the end-to-end CDR.

5. The method of claim 1, wherein the CDRs are from a plurality of different types of probes and at least two of the different types of probes have a different data structure for their corresponding CDRs.

6. The method of claim 1, wherein the CDRs are for a voice session including any of legacy calls (2G or 3G); Circuit Switched Fallback (CSFB) calls: Internet Protocol Multimedia Subsystem (IMS) calls (4G or Wi-Fi); and Inter Radio Access Technology (RAT) Handover (HO) calls: 3G to 2G, 2G to 3G, Single Radio Voice Call Continuity (SRVCC) to 2G or 3G, 4G to Wi-Fi, Wi-Fi to 4G.

7. The method of claim 1, wherein the specific interface includes any of a Service Gateway (SG) interface, an Iu CS interface, an S1 interface, an Sv interface, a Session Initiation Protocol (SIP) interface, and an A interface.

8. A distributed system for generating an end-to-end Call Detail Record (CDR) on voice and multimedia telecommunication sessions over a plurality of telecommunication network elements and interfaces, the distributed system includes:
    a plurality of processing devices configured to
    receive CDRs generated in real-time and streamed by multiple network elements, each CDR referring to a specific interface or protocol,
    process the received CDRs as they are received to identify the specific interface or protocol to which the received CDR refers and to identify a single telecommunication session based on a key associated with the received CDR,
    create an end-to-end CDR incrementally based on all of the received CDRs identified for the single telecommunication session, wherein at least two of the received CDRs have a different interface or protocol from one another, and
    generate two end-to-end CDRs for one telecommunication session, each end-to-end CDR corresponding to one direction of said telecommunication session and linking the two end-to-end CDRs for the one telecommunication session by incorporating data from one end-to-end CDR into the other for each of the end-to-end CDR identifying the other of the end-to-end CDR therein, wherein each end-to-end CDR is finalized based on a timeout value to address late or missing CDRs, and wherein the timeout value is based on a current state of the single telecommunications session and a completeness of the data gathered from the received CDRs.

9. The distributed system of claim 8, wherein the plurality of processing devices are further configured to, in a sequence of identified CDRs for a given telecommunication session, determine a first CDR to contain fault data and incorporating this fault data into the end-to-end CDR for the given telecommunication session.

10. The distributed system of claim 8, wherein the plurality of processing devices are further configured to identify CDRs that correspond to the single telecommunication session using one or more of a timestamp corresponding to the telecommunication session, subscriber identifier corresponding to the telecommunication session and rules applied to identifiers available within the CDR.

11. The distributed system of claim 8, wherein the end-to-end CDR creation is performed in real-time where the end-to-end CDR is incrementally created.

12. The distributed system of claim 8, wherein the CDRs are from a plurality of different types of probes and at least two of the different types of probes have a different data structure for their corresponding CDRs.

13. The distributed system of claim 8, wherein the CDRs are for a voice session including any of legacy calls (2G or 3G); Circuit Switched Fallback (CSFB) calls: Internet Protocol Multimedia Subsystem (IMS) calls (4G or Wi-Fi); and Inter Radio Access Technology (RAT) Handover (HO) calls: 3G to 2G, 2G to 3G, Single Radio Voice Call Continuity (SRVCC) to 2G or 3G, 4G to Wi-Fi, Wi-Fi to 4G.

14. The distributed system of claim 8, wherein the specific interface includes any of a Service Gateway (SG) interface, an Iu CS interface, an S1 interface, an Sv interface, a Session Initiation Protocol (SIP) interface, and an A interface.

15. A non-transitory computer-readable medium having instructions stored thereon for programming processing devices in a distributed system to perform the steps of:
receiving CDRs generated in real-time and streamed by multiple network elements, each CDR referring to a specific interface or protocol,
processing the received CDRs as they are received to identify the specific interface or protocol to which the received CDR refers and to identify a single telecommunication session based on a key associated with the received CDR,
creating an end-to-end CDR incrementally based on all of the received CDRs identified for the single telecommunication session, wherein at least two of the received CDRs have a different interface or protocol from one another; and
generating two end-to-end CDRs for one telecommunication session, each end-to-end CDR corresponding to one direction of said telecommunication session and linking the two end-to-end CDRs for the one telecommunication session by incorporating data from one end-to-end CDR into the other for each of the end-to-end CDR identifying the other of the end-to-end CDR therein wherein each end-to-end CDR is finalized based on a timeout value to address late or missing CDRs, and wherein the timeout value is based on a current state of the single telecommunications session and a completeness of the data gathered from the received CDRs.

16. The non-transitory computer-readable medium of claim 15, wherein the instructions further program the processing devices to perform the steps of, in a sequence of identified CDRs for a given telecommunication session, determining a first CDR to contain fault data and incorporating this fault data into the end-to-end CDR for the given telecommunication session.

17. The non-transitory computer-readable medium of claim 15, wherein the creating the end-to-end CDR is performed in real-time where the end-to-end CDR is incrementally created.

18. A distributed system for generating an end-to-end Call Detail Record (CDR) on voice and multimedia telecommunication sessions over a plurality of telecommunication network elements and interfaces, the distributed system includes:
a plurality of processing devices configured to
receive CDRs generated in real-time and streamed by multiple network elements, each CDR referring to a specific interface or protocol,
process the received CDRs as they are received to identify the specific interface or protocol to which the received CDR refers and to identify a single telecommunication session based on a key associated with the received CDR, and
create an end-to-end CDR incrementally based on all of the received CDRs identified for the single telecommunication session, wherein at least two of the received CDRs have a different interface or protocol from one another, wherein the end-to-end CDR creation is performed in real-time where the end-to-end CDR is incrementally created, and wherein the end-to-end CDR is finalized based on a timeout value to address late or missing CDRs, and wherein the timeout value is based on a current state of the single telecommunications session and a completeness of the data gathered from the received CDRs.

19. A distributed system for generating an end-to-end Call Detail Record (CDR) on voice and multimedia telecommunication sessions over a plurality of telecommunication network elements and interfaces, the distributed system includes:
a plurality of processing devices configured to receive CDRs generated in real-time and streamed by multiple network elements, each CDR referring to a specific interface or protocol,
process the received CDRs as they are received to identify the specific interface or protocol to which the received CDR refers and to identify a single telecommunication session based on a key associated with the received CDR, and
create an end-to-end CDR incrementally based on all of the received CDRs identified for the single telecommunication session, wherein at least two of the received CDRs have a different interface or protocol from one another, wherein the end-to-end CDR is finalized based on a timeout value to address late or missing CDRs, and wherein the timeout value is based on of a current state of the single telecommunications session and a completeness of the data gathered from the received CDRs,
wherein the CDRs are from a plurality of different types of probes and at least two of the different types of probes have a different data structure for their corresponding CDRs.

20. A non-transitory computer-readable medium having instructions stored thereon for programming processing devices in a distributed system to perform the steps of:
receiving CDRs generated in real-time and streamed by multiple network elements, each CDR referring to a specific interface or protocol,
processing the received CDRs as they are received to identify the specific interface or protocol to which the received CDR refers and to identify a single telecommunication session based on a key associated with the received CDR, and
creating an end-to-end CDR incrementally based on all of the received CDRs identified for the single telecommunication session, wherein at least two of the received CDRs have a different interface or protocol from one another,
wherein the creating the end-to-end CDR is performed in real-time where the end-to-end CDR is incrementally created, and wherein the creating the end-to-end CDR is finalized based on a timeout value to address late or missing CDRs, and wherein the timeout value is based on a current state of the single telecommunications session and a completeness of the data gathered from the received CDRs.

* * * * *